United States Patent
Guicherd et al.

(10) Patent No.: US 11,565,550 B2
(45) Date of Patent: Jan. 31, 2023

(54) TIRE HAVING SPECIFIED CARCASS REINFORCEMENT FOR A TWO-WHEELED VEHICLE

(71) Applicant: COMPAGNIE GENERALE DES ETABLISSEMENTS MICHELIN, Clermont-Ferrand (FR)

(72) Inventors: Charles Guicherd, Clermont-Ferrand (FR); Mickaël Precigout, Clermont-Ferrand (FR); Romain Bouchet, Clermont-Ferrand (FR); Christophe Laurent, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 643 days.

(21) Appl. No.: 16/087,860

(22) PCT Filed: Mar. 31, 2017

(86) PCT No.: PCT/FR2017/050750
§ 371 (c)(1),
(2) Date: Sep. 24, 2018

(87) PCT Pub. No.: WO2017/174904
PCT Pub. Date: Oct. 12, 2017

(65) Prior Publication Data
US 2019/0084357 A1    Mar. 21, 2019

(30) Foreign Application Priority Data

Apr. 5, 2016 (FR) ...................................... 1652975

(51) Int. Cl.
*B60C 9/02* (2006.01)
*B60C 9/07* (2006.01)
(Continued)

(52) U.S. Cl.
CPC ................. *B60C 9/07* (2013.01); *B60C 9/18* (2013.01); *B60C 9/22* (2013.01); *B60C 11/0058* (2013.01);
(Continued)

(58) Field of Classification Search
CPC .............. B60C 9/07; B60C 2015/0625; B60C 2015/0621; B60C 2015/0617;
(Continued)

(56) References Cited

U.S. PATENT DOCUMENTS 3,244,215 A * 4/1966 Bridge, Jr. .............. B60C 15/06
152/564
3,392,773 A * 7/1968 Warren .................... B60C 15/06
152/541
(Continued)

FOREIGN PATENT DOCUMENTS

DE      21 64 366      6/1973
JP      2001 138707    5/2001
(Continued)

*Primary Examiner* — Adrienne C. Johnstone
(74) *Attorney, Agent, or Firm* — Cozen O'Connor

(57) ABSTRACT

A tire for a two-wheeled motorized vehicle includes a tread joined by two sidewalls to two beads, the tread having first and second elastomer compositions, crown reinforcement, radially inside tread having a crown layer having mutually parallel circumferential reinforcers forming an angle at most equal to 5° to the circumferential direction, a carcass reinforcement, radially inside crown reinforcement, having turnup. Carcass reinforcement includes mutually parallel reinforcers, and wrapped, in each bead, from the inside to the outside of the tire, about bead wire in order to form turnup having free end $E_2$. Carcass reinforcement includes crown portion and lateral portion, crown portion extending axially between first and second ends $E_2$, $E'_2$, $E_2$ and $E'_2$ being symmetric to equatorial plane P of the tire, lateral portion extending symmetrically to equatorial plane P radially
(Continued)

towards the inside, from radially outermost end $E_2$ to fourth end $E_4$ disposed at the bead wire.

13 Claims, 2 Drawing Sheets

(51) Int. Cl.
*B60C 9/14* (2006.01)
*B60C 9/18* (2006.01)
*B60C 9/22* (2006.01)
*B60C 11/00* (2006.01)
*B60C 15/00* (2006.01)

(52) U.S. Cl.
CPC ...... *B60C 15/0045* (2013.01); *B60C 15/0054* (2013.01); *B60C 2009/0276* (2013.01); *B60C 2009/2214* (2013.01); *B60C 2011/0025* (2013.01); *B60C 2200/10* (2013.01)

(58) Field of Classification Search
CPC ... B60C 15/0045; B60C 15/0036; B60C 9/14; B60C 2009/0223; B60C 2009/0491
USPC .......................................... 152/562, 552, 554
See application file for complete search history.

(56) References Cited

U.S. PATENT DOCUMENTS

| | | | | | |
|---|---|---|---|---|---|
| 4,588,009 | A | * | 5/1986 | Kitazawa | B60C 11/005 152/209.11 |
| 5,569,341 | A | * | 10/1996 | Fukushima | B60C 13/002 152/527 |
| 5,674,331 | A | * | 10/1997 | Saeki | B60C 9/18 152/209.5 |
| 6,273,162 | B1 | * | 8/2001 | Ohara | B60C 1/0008 152/539 |
| 6,543,504 | B2 | * | 4/2003 | Auxerre | B60C 15/00 152/547 |
| 6,742,559 | B2 | * | 6/2004 | Iwamura | B60C 11/01 152/209.16 |
| 7,202,295 | B2 | * | 4/2007 | Simonot | B60C 1/00 |
| 7,523,774 | B2 | * | 4/2009 | Lahure | B60C 15/06 152/539 |
| 8,176,956 | B2 | * | 5/2012 | Nakagawa | B60C 11/005 152/209.5 |
| 9,126,458 | B2 | * | 9/2015 | Mangia | B60C 15/06 |
| 2004/0007305 | A1 | * | 1/2004 | Ueyoko | B60C 15/06 152/552 |
| 2008/0236716 | A1 | * | 10/2008 | Bergman | 152/564 X |
| 2015/0144241 | A1 | * | 5/2015 | Laurent | B60C 9/07 |

FOREIGN PATENT DOCUMENTS

| | | |
|---|---|---|
| WO | WO 02/053634 | 7/2002 |
| WO | WO 2014/001379 | 1/2014 |

* cited by examiner

TIRE HAVING SPECIFIED CARCASS REINFORCEMENT FOR A TWO-WHEELED VEHICLE

RELATED APPLICATIONS

This is a U.S. National Phase Application under 35 USC 371 of International Application PCT/FR2017/050750 filed on Mar. 31, 2017.

This application claims the priority of French application no. 1652975 filed Apr. 5, 2016.

FIELD OF THE INVENTION

The invention relates to a radial tire intended to be fitted to a two-wheeled motorized vehicle, such as a motorcycle or motorbike.

Although not limited to such an application, the invention will be described more particularly with reference to a radial tire intended to be mounted on the rear of a motorbike.

BACKGROUND OF THE INVENTION

In what follows, and by convention, the circumferential, axial and radial directions refer respectively to a direction tangential to the tread surface of the tire in the direction of rotation of the tire, to a direction parallel to the axis of rotation of the tire, and to a direction perpendicular to the axis of rotation of the tire. "Radially inside and, respectively, radially outside" means "closer to and, respectively, further away from the axis of rotation of the tire". "Axially inside and, respectively, axially outside" means "closer to and, respectively, further away from the equatorial plane of the tire", the equatorial plane of the tire being the plane passing through the middle of the tread surface of the tire and perpendicular to the axis of rotation of the tire. Angles with respect to the circumferential direction that are mentioned in what follows are not oriented and are given in terms of absolute value.

A tire comprises a tread that is intended to come into contact with the ground via the tread surface and is connected via two sidewalls to two beads that provide the mechanical connection between the tire and the rim on which it is mounted.

A radial tire also comprises a reinforcement comprising a crown reinforcement radially inside the tread and a carcass reinforcement usually radially inside the crown reinforcement.

The crown reinforcement of a radial motorbike tire generally comprises at least one crown layer made up of reinforcers coated in a polymer material of the elastomer type. The reinforcers are usually made of a textile material, such as aramid, but may also be made of metal. Those skilled in the art have proposed various crown reinforcement architectures depending on whether the tire is intended to be mounted on the front or on the rear of the motorbike. However, the crown reinforcement is usually made up of a circumferential crown layer comprising circumferential reinforcers, that is to say reinforcers which form an angle that is substantially zero and at most equal to 5° with the circumferential direction.

The carcass reinforcement of a radial motorbike tire comprises either a carcass layer that forms an angle of 90° plus or minus 5 degrees with the circumferential direction along its entire length, or a plurality of carcass layers that form an angle of greater than 65° with the circumferential direction, with a minimum value achieved at the middle of the tread surface.

A carcass layer is said to have a turnup when it comprises a main part that connects the two beads together and is wrapped, in each bead, from the inside of the tire to the outside around a bead wire so as to form a turnup having a free end. The bead wire is a circumferential reinforcing element, usually made of metal and coated in a generally elastomeric or textile material. In the case of a carcass layer with a turnup, the turnup in each bead anchors the turned-up carcass layer to the bead wire. The portion of bead wire in contact with the turned-up carcass layer contributes, particularly upon inflation, to the reaction by coupling of the tensile loadings in the turned-up carcass layer. This contribution towards reacting the tensile loadings is dependent on the torsional rigidity of the bead wire and on the geometry of the turnup. In instances in which the bead wire has high torsional rigidity, the tensile loadings on inflation are essentially reacted by the bead wire, with the turnup making a secondary contribution. In instances in which the bead wire has a lower torsional rigidity, the tensile loadings are reacted both by coupling with the bead wire and by shear between the turnup and the materials adjacent thereto, this requiring a turnup that is sufficiently long, that is to say the end of which is sufficiently radially distant from the radially innermost point of the bead wire. A turnup is said to be long when the radial distance between its end and the radially innermost point of the bead wire is at least equal to 0.3 times the design section height of the tire as defined by the standards of the European Tire and Rim Technical Organisation or ETRTO.

A carcass layer does not have a turnup when it is made up only of a main part that connects the two beads together without being wrapped around a bead wire. In the case of a carcass layer without a turnup, each of the two end portions of said carcass layer without a turnup may be coupled either with the turnup of at least one turned-up carcass layer or with the main part of at least one turned-up carcass layer. Coupling is understood to mean a region of overlap between the carcass layer without a turnup and a turned-up carcass layer, allowing the tensile loadings to be reacted by shear.

The reinforcers in the main part of a carcass layer with or without a turnup are substantially mutually parallel and form an angle of between 65° and 90° with the circumferential direction.

A first known architecture of a radial tire for mounting at the rear of a motorbike comprises a carcass reinforcement made up of a carcass layer with a turnup and a carcass layer without a turnup, radially inside a crown reinforcement made up of a circumferential crown layer. The carcass layer without a turnup is radially outside the main part of the turned-up carcass layer but radially inside the turnup of the turned-up carcass layer. The turned-up end of the turned-up carcass is radially inside the end of the circumferential crown layer, meaning that there is no overlap between the turnup of the turned-up carcass layer and the circumferential crown layer. The respective reinforcers of the turned-up carcass layer and of the carcass layer without a turnup form, with the circumferential direction, angles that are substantially equal in absolute value, of opposite sign and between 85° and 90°. On account of the coupling between the radial carcass layer and the circumferential crown layer in the crown region of the tire, such an architecture ensures satisfactory stability of the motorbike in a straight line. In a straight line, many motorbikes can achieve speeds in excess of 200 km/h.

A second known architecture of a radial tire for mounting at the rear of a motorbike comprises a carcass reinforcement made up of a carcass layer with a turnup and a carcass layer without a turnup, radially inside a crown reinforcement made up of a circumferential crown layer. The carcass layer without a turnup is radially outside the main part of the turned-up carcass layer but radially inside the turnup of the turned-up carcass layer. The turned-up end of the turned-up carcass is radially inside the end of the circumferential crown layer, meaning that there is no overlap between the turnup of the turned-up carcass layer and the circumferential crown layer. The respective reinforcers of the turned-up carcass layer and of the carcass layer without a turnup form, with the circumferential direction, angles that are substantially equal in absolute value, of opposite sign and between 65° and 85°. On account of the triangulation effect resulting from the criss-crossing of the reinforcers from one carcass layer to the other, particularly in the sidewalls, such an architecture ensures sufficient stability of the motorbike on a curved path. The camber angle of the rear tire, between the equatorial plane of the tire and the plane perpendicular to the ground and tangential to the path, is usually greater than 20° and can range up to 60° on a curved path.

SUMMARY OF THE INVENTION

One object of the present invention is to provide a carcass reinforcement for a radial tire to be mounted at the rear of a motorbike that makes it possible to ensure satisfactory stability of the motorbike both in a straight line at high speed and on a curved path with a high camber angle.

This aim has been achieved according to one aspect of the invention directed to a tire for a two-wheeled motorized vehicle of the motorcycle type, comprising:

a—a tread, of half-width L, that is joined by two sidewalls to two beads, said tread comprising a first elastomer composition and a second elastomer composition, b—a crown reinforcement, radially inside the tread, comprising a crown layer comprising mutually parallel circumferential reinforcers that are coated with an elastomer composition and form an angle that is substantially zero and at most equal to 5° with respect to the circumferential direction, c—a carcass reinforcement, radially inside the crown reinforcement, comprising a turnup on the sidewall side of the tire and having a thickness M, the carcass reinforcement comprising mutually parallel reinforcers that are coated with an elastomer composition, and being wrapped, in each bead, from the inside to the outside of the tire, about a bead wire in order to form a turnup at the bead wire and comprising a free end, the carcass reinforcement comprising a crown portion and a lateral portion, the crown portion extending axially between a first end $E_2$ and a second end $E'_2$, both of which are symmetric with respect to the equatorial plane (P) of the tire, the lateral portion extending symmetrically with respect to the equatorial plane (P) radially towards the inside, from the radially outermost end $E_2$ to a fourth end $E_4$ disposed at the bead wire.

According to an embodiment of the invention, the thickness M of the reinforcing layer of the carcass reinforcement comprises only the reinforcement without the turnup of the carcass reinforcement.

The reinforcers of the radially inner carcass reinforcement form, with the circumferential direction, an angle $A_3$ of between 55° and 70° at the end $E_2$ increasing to an angle of between 70° and 80° at the end $E_4$, the reinforcers of the radially outer carcass reinforcement forming an angle $A_4$ of the same absolute value as but of opposite sign to the angle $A_3$. The carcass reinforcement comprises an elastomer composition having a modulus of rigidity MA10 at 10% elongation of between 9 and 15 MPa and a modulus of rigidity MA100 at 100% elongation of between 4 and 7 MPa. The crown portion (611) comprises a central first part that is symmetric with respect to the equatorial plane and extends from the end $E_1$ axially outside the end $E_2$ to said equatorial plane, said central first part comprising reinforcers that form, with the circumferential direction, an angle $A_1$ that is substantially constant and greater than 80°. The crown portion comprises a lateral second part which extends, symmetrically with respect to the equatorial plane, from the end $E_1$ to the end $E_2$, said lateral second part comprising reinforcers that form, with the circumferential direction, an angle $A_2$ of greater than 80° at the end $E_1$, decreasing to an angle of between 55° and 70° at the end $E_2$, such that the difference in angle $A_2$ between the ends $E_1$ and $E_2$ is greater than or equal to 15°.

The choice of the variation in angle of the reinforcers of the lateral portion makes it possible to adjust the rigidity of that portion of the carcass reinforcement that is vertically aligned with the surface in contact with the ground, in a curve and with a high camber, at least equal to 30°, so as to obtain optimal stability of the motorbike in a curve. Moreover, the variation in angle of the reinforcers of the lateral portion is dependent on the substantially constant angle chosen for the reinforcers of the crown portion.

The nominal section half-width L (or section width) is defined by the section half-width of a tire mounted on a rim and inflated.

The elastic modulus of a material is understood to be the secant extension modulus obtained under tension in accordance with the ASTM D 412 standard of 1998 (test specimen "C"): the apparent secant modulus values at 10% elongation, denoted "MA10" and expressed in MPa (under standard temperature and relative humidity conditions in accordance with the ASTM D 1349 standard of 1999), are measured in second elongation (that is to say after an accommodation cycle). This elastic modulus should be distinguished from the elastic modulus values obtained in compression, the values of which generally have no bearing on the modulus values obtained in extension.

The crown portion is disposed radially inside the crown reinforcement and its ends are axially inside the ends of the tread surface, meaning that the axial width of the crown portion is less than the axial width of the tread.

The angling of the reinforcers of the crown portion, said to be substantially radial, gives the tire low cornering stiffness. Cornering stiffness is the lateral force generated by the tire or drift thrust, when a sideslip angle of 1° is applied to it, the sideslip angle being the angle formed by the straight line that is the intersection of the equatorial plane of the tire with the ground, and the straight line tangential to the path. This substantially radial angling thus contributes towards obtaining a flexible crown generating low drift thrust, this contributing towards ensuring good stability of the motorbike in a straight line.

The criss-crossing of the respective reinforcers of the lateral portion and of the turnup gives the tire high cornering stiffness when the tire, on a curved path, has a high camber angle, at least equal to 30°. The camber angle is the angle formed by the equatorial plane of the tire with the plane perpendicular to the ground and tangential to the path. With a high camber, the portion of the carcass reinforcement that is formed by the lateral portion and the turnup is vertically aligned with the surface of the tire in contact with the ground. Therefore, the tire portion in contact with the ground has relatively high rigidity. The tire then generates high thrust, ensuring good stability of the motorbike on a curved path.

Thus, the existence of two carcass layer portions, which are substantially radial at the crown and crossed with the turnup at the sidewall, respectively, ensures good stability of the motorbike in a straight line, at a zero camber angle, and in a curve, with a high camber angle at least equal to 30°, respectively.

Preferably, a layer of uncoupling elastomer composition $C_3$ is disposed between the radially inner carcass reinforcement and the turnup of the carcass reinforcement from the end $E_1$ to an end $E_3$, the end $E_3$ being radially inside the end $E_2$ and radially outside the end $E_4$, such that the end $E_2$ is equidistant from the ends $E_1$ and $E_3$, said uncoupling elastomer composition having a modulus of rigidity MA10, at 10% elongation, of between 3 and 7 MPa, and a modulus of rigidity MA100, at 100% elongation, of between 1.5 and 4 MPa.

Preferably, the tread comprises a first part $P_1$ and a second part $P_2$ that are juxtaposed at a fifth end $E_5$ common to said parts, said parts $P_1$ and $P_2$ being disposed symmetrically with respect to the equatorial plane, said first part $P_1$ being central and having an axial half-width $L_0$, between the equatorial plane P and the end $E_5$, at least equal to (0.55)L and at most equal to (0.8)L, and comprising a central first layer of elastomer composition $C_1$, said second part being lateral and having a half-width $L_1$ disposed between the end $E_5$ and the axial end of the nominal section width L and equal to $L-L_0$, and comprising the first layer of elastomer composition $C_1$ radially inside a second layer of elastomer composition $C_2$.

Preferably, the first layer of elastomer composition $C_1$ has a modulus of rigidity MA10 at 10% elongation of between 3.5 and 5 MPa and a modulus of rigidity MA100 at 100% elongation of between 1 and 1.7 MPa.

Preferably, the second layer of elastomer composition $C_2$ has a modulus of rigidity MA10 at 10% elongation of between 2.5 and 4 MPa and a modulus of rigidity MA100 at 100% elongation of between 1 and 1.3 MPa.

Preferably, the first layer of elastomer composition $C_1$ represents between 0.65 and 0.8 times the total volume of the tread.

Preferably, the layer of uncoupling elastomer composition $C_3$ has a thickness greater than 0.7 M, M being the thickness of the reinforcing layer of the carcass reinforcement.

Preferably, the substantially constant angle $A_1$ formed with the circumferential direction X by the reinforcers of the crown portion is at least equal to 80°.

Preferably, the crown portion has an axial half-width L3 at least equal to 0.7 times and at most equal to 0.85 times the axial width of the tread half-width L.

Preferably, the angle ($A_3$) formed with the circumferential direction (X) by the reinforcers of the lateral portion (612) increases from a minimum angle of between 55° and 70° at the end $E_2$ to a maximum angle of between 70° and 80° at the end $E_4$.

Preferably, the lateral portion has a radial height $H_2$, $H_2$ being the radial height between the ends $E_2$ and the radially innermost point of the end of the bead, at least equal to 0.55 times and at most equal to 0.65 times the height H of the meridian section of the tire.

This radial height governs the axial width of the portion of carcass reinforcement vertically aligned with the surface in contact with the ground, in a curve and with a high camber, at least equal to 30°. This characteristic is a parameter by means of which the cornering stiffness is adjusted for riding in curves with a high camber.

Preferably, the reinforcers of the carcass reinforcement are made of textile, preferably polyester or nylon. The reinforcers of the crown reinforcement can be made of textile, preferably aramid.

Advantageously, the substantially constant angle formed with the circumferential direction by the reinforcers of the crown portion is at least equal to 80°. An angle at least equal to 80°, and thus close to 90°, gives the motorbike optimal stability in a straight line.

BRIEF DESCRIPTION OF THE DRAWINGS

Further advantageous details and features of the invention will become apparent below from the description of embodiments of the invention with reference to FIGS. 1 and 2 and from the following examples, wherein, in the figures:

In order to make them easier to understand, FIGS. 1 and 2 are not drawn to scale.

DETAILED DESCRIPTION OF THE DRAWINGS

Figure 1:
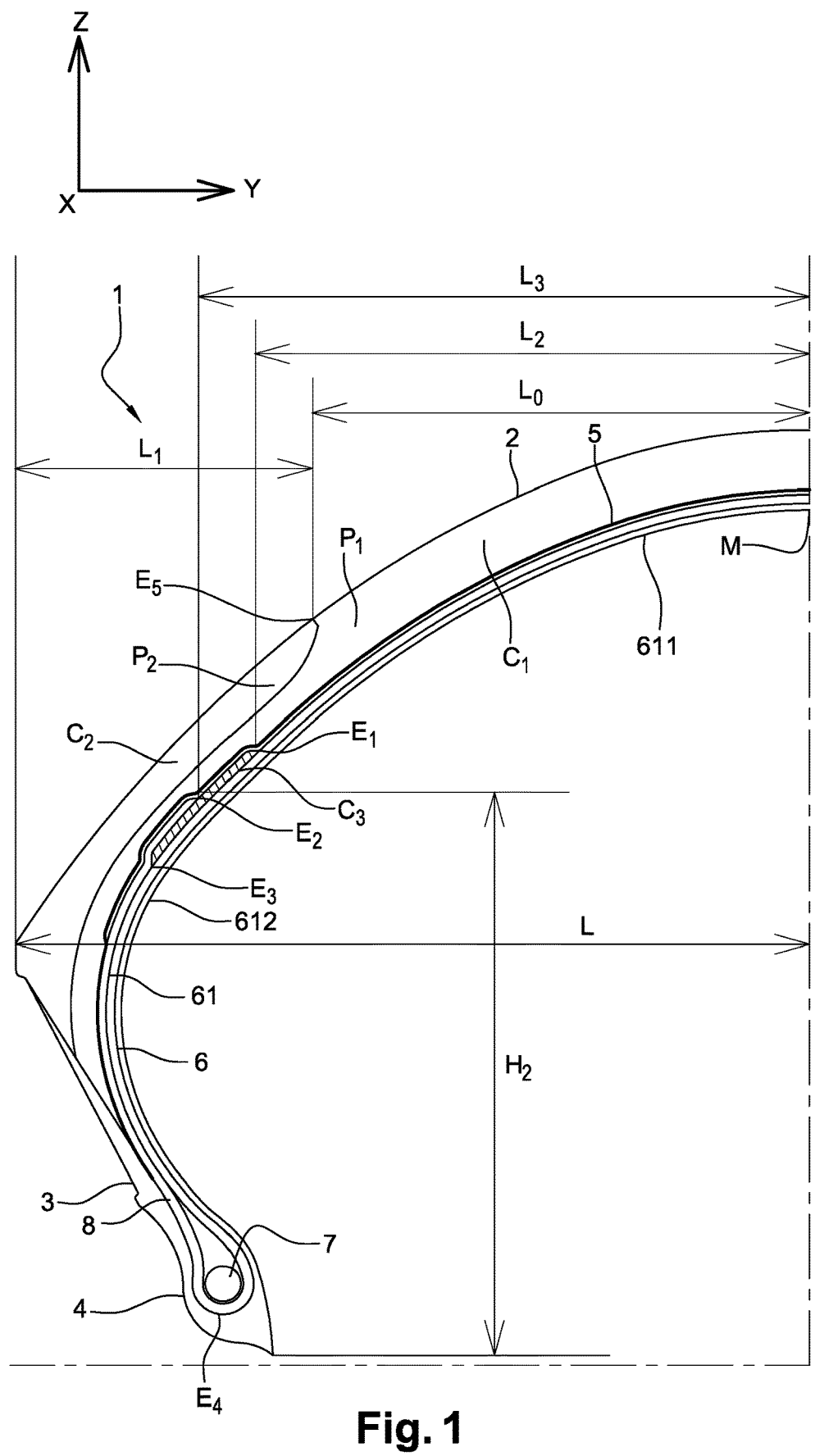
FIG. 1 shows a meridian half section of a tire.

FIG. 1 shows a tire 1 comprising a tread 2 connected by two sidewalls 3 to two beads 4, a crown reinforcement 5, radially inside the tread 2, comprising at least one crown layer, a carcass reinforcement 6, radially inside the crown reinforcement 5, comprising at least one turned-up carcass layer 61. The turned-up carcass layer 61 comprises, at the sidewall, reinforcers that are mutually parallel and is wrapped, in each bead 4, from the inside to the outside of the tire, around a bead wire 7 to form a turn-up 8 at the bead wire 7.

The crown portion 611 of the turned-up carcass layer 61 extends axially between a first and a second end $E_2$ and $E'_2$, (not shown) which are symmetric with respect to the equatorial plane P. The axial half-width $L_3$ is between 0.7 and 0.85 times the axial half-width L of the tread, defined between the two axial ends of the tread surface. The crown portion 611 is thus centred with respect to the equatorial plane P of the tire, defined by the respectively circumferential X and radial Z directions.

The lateral portion 612 of the turned-up carcass layer 61 extends, in the sidewall 3, radially towards the inside, from a radially outermost first end $E_2$ to a second end $E_4$ disposed at the bead wire 7. It also extends axially inside the turnup 8. The radial height $H_2$ between the first and second ends $E_2$ and $E_4$ is between 0.55 times and 0.65 times the design section height H, measured between the point on the tread surface that is positioned in the equatorial plane and the radially innermost point of the bead 4.

The turnup 8 extends radially towards the outside from the radially innermost end $E_4$ of the lateral portion 612 as far as the free end $E_2$ of the turnup 8.

A layer of uncoupling elastomer composition $C_3$ is disposed between the radially inner carcass reinforcement and the turnup 8 of the carcass reinforcement from the free end $E_1$ to an end $E_3$. This uncoupling elastomer composition has a rigidity of between 5 and 7 MPa at 10% elongation. The use of this uncoupling composition makes it possible to avoid decohesion of the radially inner carcass reinforcement and the turnup 8 of this carcass reinforcement.

The tread 2 comprises a first part $P_1$ and a second part $P2$ that are juxtaposed at a fifth end $E_5$. The parts $P_1$ and $P_2$ are disposed symmetrically with respect to the equatorial plane P.

The part $P_1$ is central and has an axial half-width $L_0$ comprised between the plane P and the end $E_5$ of between 0.55L and 0.65L. This part $P_1$ comprises a single layer $C_1$ of elastomer composition having a modulus of rigidity MA10 at 10% elongation of between 3 and 5 MPa.

The part $P_2$ is disposed towards the axially outer ends of the tread of half-width $L_1$. This part $P_2$ comprises two layers $C_1$ and $C_2$. The radially outer first layer $C_1$ has an elastomer composition having a modulus of rigidity MA10 at 10% elongation of between 3 and 5 MPa and a modulus of rigidity MA100 at 100% elongation of between 1 and 1.7 MPa. The radially inner second layer $C_2$ has an elastomer composition having a modulus of rigidity MA10 at 10% elongation of between 2.5 and 4 MPa and a modulus of rigidity MA100 at 100% elongation of between 1 and 1.3 MPa.

The proportion by volume of the layer $C_1$ over the two parts $P_1$ and $P_2$ with respect to the complete volume of the tread 2 is between 0.65 and 0.8.

Figure 2:
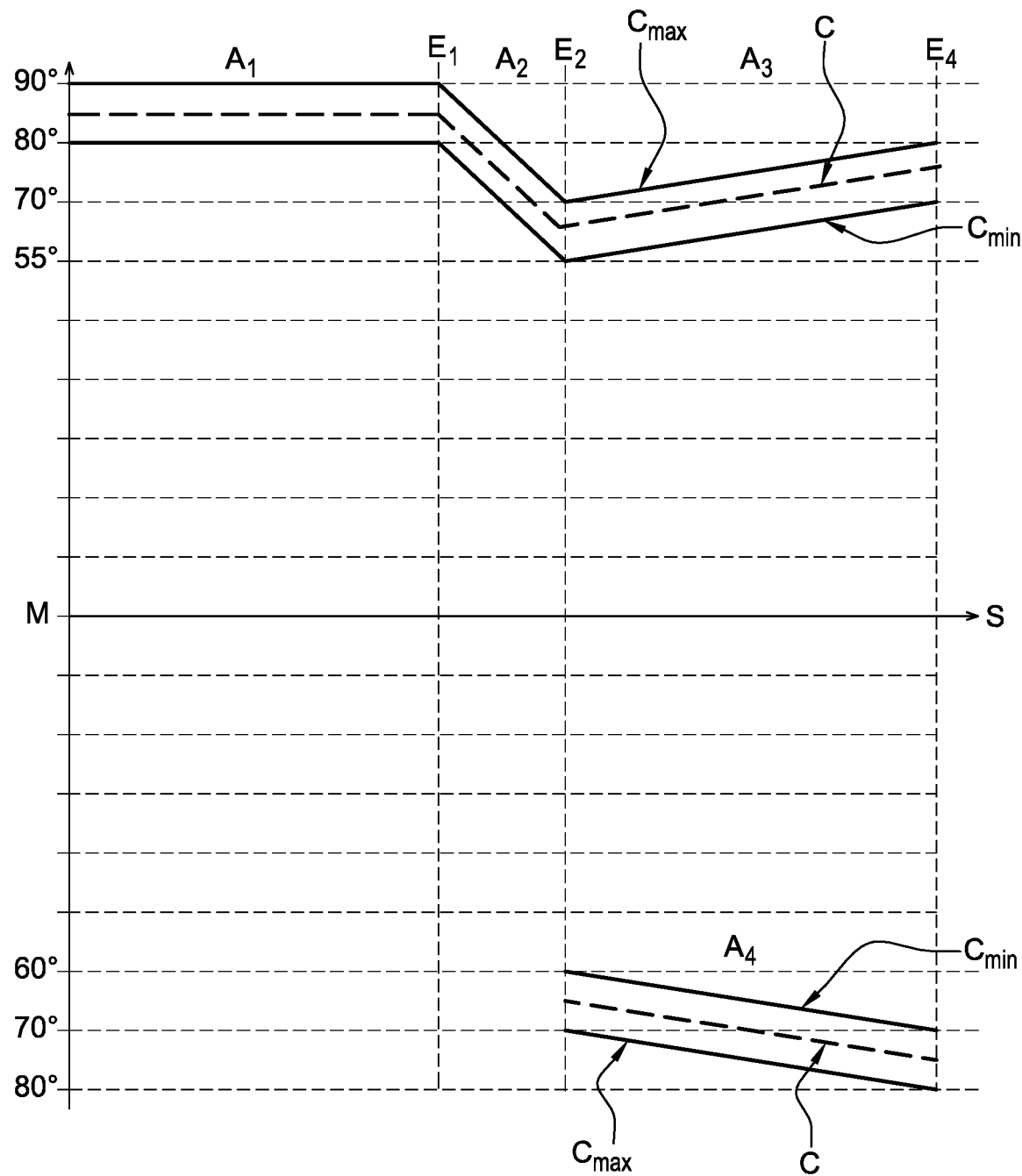
FIG. 2 shows the graph representing the range of change of the angle formed, with the circumferential direction, by the reinforcers of the carcass layer with a turnup, along its curved abscissa comprised between the equatorial plane and the end of the turnup.

FIG. 2 shows the range of change of the angle A formed, with the circumferential direction X, by the reinforcers of the turned-up carcass layer, as a function of the curved abscissa value s, comprised between the point M of the equatorial plane and the end $E_1$ of the turnup. The curve $C_{max}$ is the envelope curve of maximum angle. The curve $C_{min}$ is the envelope curve of minimum angle. The curve C is a standard example of how the angle changes, as a function of the curved abscissa value along the turned-up carcass layer. Positive values for the angle correspond to the changes in the angle along the crown portion and the lateral portion, respectively. Negative values for the angle correspond to changes in the angle along the turn-up 8.

The first portion of the range of change corresponds to that part of the crown portion 611 that is comprised between the points M and $E_1$, for which the reinforcers form, with the circumferential direction X, a substantially constant angle $A_1$ of between 80° and 90°.

The second portion of the range of change corresponds to that part of the crown portion that is comprised between the end $E_1$ and the end $E_2$, for which the reinforcers form, with the circumferential direction X, an angle $A_2$ that decreases from the end $E_1$ to the end $E_2$.

The third portion of the range of change corresponds to the lateral portion 612 comprised between the ends $E_2$ and $E_4$, for which the reinforcers form, with the circumferential direction X, an angle $A_3$ that increases, from the radially outermost first end $E_2$ to the radially innermost end $E_4$, from an angle at least 10° smaller than the substantially constant angle $A_1$ formed, with the circumferential direction, by the reinforcers of the crown portion 611.

The fourth portion of the range of change corresponds to the turnup 8, for which the reinforcers form, with the circumferential direction X, an angle $A_4$, of opposite sign to the angle $A_3$, formed by the reinforcers of the lateral portion 612. This angle $A_4$ decreases, in terms of absolute value, from a maximum angle of between 70° and 80° at the end $E_4$ of the lateral portion 612 until it reaches a minimum angle of between 60° and 70° at the end $E_2$ of the turnup 8.

The invention has been studied more particularly on the 180/55 ZR 17 and 190/50 ZR 17 sizes. The values derived from these sizes are set out in Table I below.

TABLE I

|  | 180/55 ZR 17 | 190/50 ZR 17 |
| --- | --- | --- |
| H | 106 mm | 112.5 mm |
| $H_2$ | 65.6 mm | 67.8 mm |
| $H_2/H$ | 0.62 | 0.60 |
| $L_0$ | 56.2 mm | 60.7 mm |
| $L_1$ | 34.8 mm | 36.3 mm |
| $L_2$ | 63.9 mm | 67.5 mm |
| $L_3$ | 71.5 mm | 75.2 mm |
| L | 91 mm | 97 mm |
| $L_0/L$ | 0.62 | 0.63 |
| Thickness layer $C_3$ | 0.94M | 0.94M |
| Angle $A_1$ | 82° | 82° |
| Angle $A_3$ at the end $E_2$ | 64° | 62° |
| Angle $A_3$ at the end $E_4$ | 74° | 74° |
| Volume $C_1$ | 1050 cm3 | 1133 cm3 |
| Volume $C_2$ | 432 cm3 | 448 cm3 |
| Volume $C_1$/total volume | 70.85% | 71.66% |

In this tire size under study, the reinforcers of the turned-up carcass layer are made of polyester, while the reinforcers of the circumferential crown layer are made of aramid.

The cornering stiffness of this size was compared with the respective cornering stiffnesses of a first reference size $R_1$ and a second reference size $R_2$. The first reference size $R_1$ comprises a carcass reinforcement, made up of a single carcass layer at 90°, and a crown reinforcement, made up of a single circumferential crown layer. The reference $R_1$ is the reference for stability in a straight line. The second reference size $R_2$ comprises a carcass reinforcement, made up of two crossed carcass layers at 65°, and a crown reinforcement, made up of a single circumferential crown layer. The reference $R_2$ is the reference for stability in a curve.

The results obtained are presented in Table II below:

TABLE II

|  | Reference $R_1$ | Reference $R_2$ | Invention |
| --- | --- | --- | --- |
| Cornering stiffness with a zero camber angle | 100 | 110 | 100 |
| Cornering stiffness with a camber angle equal to 30° | 100 | 120 | 130 |

The tire size under study has levels of cornering stiffness that are at least equivalent to the best performing reference, whether riding in a straight line with a zero camber angle or in a curve with a high camber. It has a cornering stiffness that is rather low in a straight line and rather high in a curve.

The invention should not be understood as being limited to the description of the examples above and extends notably to tires that can have carcass reinforcements in which no carcass layer has a turnup. The lateral portion of carcass without a turnup is then not axially inside a turnup but axially inside an independent portion of carcass layer anchored in the bead.

The invention claimed is:
1. A tire for a two-wheeled motorized vehicle of the motorcycle type, comprising:
 a—a tread, of half-width L, that is joined by two sidewalls to two beads, said tread comprising a first elastomer composition and a second elastomer composition, b—a crown reinforcement, radially inside the tread, comprising a crown layer comprising mutually parallel circumferential reinforcers that are coated with an elastomer composition and form an angle that is at most equal to 5° with respect to the circumferential direction, c—a carcass reinforcement, radially inside the crown reinforcement, comprising a turned-up carcass layer, wherein the turned-up carcass layer comprises mutually parallel reinforcers that are coated with an elastomer composition, and being wrapped, in each bead, from the inside to the outside of the tire, about a bead wire in order to form the turnup comprising a free end $E_2$, wherein the turned-up carcass layer of the carcass reinforcement has a thickness M without the turnup, the turned-up carcass layer comprising a crown portion and a lateral portion, wherein the crown portion extends axially between a first end $E_2$ and a second end $E'_2$, $E_2$ and $E'_2$ being symmetric with respect to the equatorial plane P of the tire, wherein the lateral portion extends symmetrically with respect to the equatorial plane P radially towards the inside, from the radially outermost end $E_2$ to a fourth end $E_4$ disposed at the bead wire, wherein, in the lateral portion, the reinforcers of the radially inner carcass reinforcement form, with the circumferential direction, an angle $A_3$ of between 55° and 70° at the end $E_2$ increasing to an angle of between 70° and 80° at the end $E_4$, the reinforcers of the radially outer carcass reinforcement forming an angle $A_4$ of the same absolute value as but of opposite sign to the angle $A_3$, wherein the carcass reinforcement comprises an elastomer composition having a modulus of rigidity MA10 at 10% elongation of between 9 and 15 MPa and a modulus of rigidity MA100 at 100% elongation of between 4 and 7 MPa, wherein the crown portion comprises a central first part that is symmetric with respect to the equatorial plane and extends from the end $E_1$ axially outside the end $E_2$ to said equatorial plane, said central first part comprising reinforcers that form, with the circumferential direction, an angle $A_1$ that is constant and greater than 80°, and wherein the crown portion comprises a lateral second part which extends, symmetrically with respect to the equatorial plane, from the end $E_1$ to the end $E_2$, said lateral second part comprising reinforcers that form, with the circumferential direction, a first angle $A_2$ of greater than 80° at the end $E_1$ decreasing to a second angle of between 55° and 70° at the end $E_2$, such that the first angle and the second angle form, between one another, a difference in angle $A_2$ of greater than or equal to 15°, wherein a layer of uncoupling elastomer composition is disposed between and directly adjacent to the radially inner carcass reinforcement and the respective turnup from the end $E_1$ to an end $E_3$, the end $E_3$ being radially inside the end $E_2$ and radially outside the end $E_4$, such that the end $E_2$ is equidistant from the ends $E_1$ and $E_3$.

2. The tire according to claim 1, wherein said uncoupling elastomer composition has a modulus of rigidity MA10, at 10% elongation, of between 3 and 7 MPa, and a modulus of rigidity MA100, at 100% elongation, of between 1.5 and 4 MPa.

3. The tire according to claim 1, wherein the tread comprises a first part $P_1$ and a second part $P_2$ that are juxtaposed at a fifth end $E_5$ common to said parts, said parts $P_1$ and $P_2$ being disposed symmetrically with respect to the equatorial plane, said first part $P_1$ being central and having an axial half-width $L_0$, between the equatorial plane P and the end $E_5$, at least equal to 0.55L and at most equal to 0.8L, and comprising a central layer of the first elastomer composition $C_1$, said second part being lateral and having a half-width $L_1$ disposed between the end $E_5$ and the axial end of the nominal section width L and equal to $L-L_0$, and comprising a layer of the first elastomer composition $C_1$ radially inside a layer of the second elastomer composition $C_2$.

4. The tire according to claim 3, wherein the first elastomer composition $C_1$ has a modulus of rigidity MA10 at 10% elongation of between 3.5 and 5 MPa and a modulus of rigidity MA100 at 100% elongation of between 1 and 1.7 MPa.

5. The tire according to claim 3, wherein the second elastomer composition $C_2$ has a modulus of rigidity MA10 at 10% elongation of between 2.5 and 4 MPa and a modulus of rigidity MA100 at 100% elongation of between 1 and 1.3 MPa.

6. The tire according to claim 3, wherein the first elastomer composition $C_1$ in the two parts P1 and P2 occupies between 0.65 and 0.8 times the complete volume of the tread.

7. The tire according to claim 1, wherein the layer of uncoupling elastomer composition has a thickness greater than 0.7 M.

8. The tire according to claim 1, wherein the crown portion has an axial half-width at least equal to 0.7 times and at most equal to 0.85 times the axial width of the tread half-width L.

9. The tire according to claim 1, wherein the lateral portion has a radial height $H_2$, $H_2$ being the radial height between the ends $E_2$ and the radially innermost point of the ends of the beads, at least equal to 0.55 times and at most equal to 0.65 times the height of the meridian section of the tire.

10. The tire according to claim 1, wherein the reinforcers of the turned-up carcass layer are made of textile.

11. The tire according to claim 1, wherein the reinforcers of the crown reinforcement are made of textile.

12. The tire according to claim 1, wherein the reinforcers of the turned-up carcass layer are made of polyester or nylon.

13. The tire according to claim 1, wherein the reinforcers of the crown reinforcement are made of aramid.

* * * * *